(12) United States Patent  
Matsuda et al.

(10) Patent No.: US 8,979,692 B2
(45) Date of Patent: Mar. 17, 2015

(54) FRICTION TRANSMISSION BELT

(75) Inventors: Hisashi Matsuda, Hyogo (JP); Shinji Takahashi, Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 379 days.

(21) Appl. No.: 13/258,817

(22) PCT Filed: Mar. 26, 2009

(86) PCT No.: PCT/JP2009/001367
§ 371 (c)(1),
(2), (4) Date: Sep. 22, 2011

(87) PCT Pub. No.: WO2010/109532
PCT Pub. Date: Sep. 30, 2010

(65) Prior Publication Data
US 2012/0021858 A1    Jan. 26, 2012

(51) Int. Cl.
*F16G 1/06* (2006.01)
*F16G 5/20* (2006.01)

(52) U.S. Cl.
CPC ........................................ *F16G 5/20* (2013.01)
USPC ........................................................ 474/237

(58) Field of Classification Search
CPC .......................................................... F16G 5/20
USPC .................................................. 474/237, 253
See application file for complete search history.

(56) References Cited

U.S. PATENT DOCUMENTS

| 5,498,212 | A | 3/1996 | Kumazaki |
| 2007/0060431 | A1 | 3/2007 | Hineno et al. |
| 2007/0082777 | A1* | 4/2007 | Nishida et al. ................ 474/237 |
| 2007/0111834 | A1* | 5/2007 | Matsuda et al. .............. 474/202 |
| 2007/0244263 | A1* | 10/2007 | Burrowes .................... 525/326.1 |

FOREIGN PATENT DOCUMENTS

| EP | 2 105 460 | 9/2009 |
| JP | 7-151191 | 6/1995 |
| JP | 2001-165244 | 6/2001 |
| JP | 2001-254782 | 9/2001 |
| JP | 2003-202055 | 7/2003 |
| JP | 2004-125012 | 4/2004 |
| JP | 2004-150524 | 5/2004 |
| JP | 2004-176904 | 6/2004 |
| JP | 2004-232743 | 8/2004 |
| JP | 2004-257459 | 9/2004 |
| JP | 2006-64174 | 3/2006 |

(Continued)

OTHER PUBLICATIONS

International Search Report, PCT/JP2009/001367, Apr. 21, 2009.

*Primary Examiner* — William E Dondero
*Assistant Examiner* — Robert T Reese
(74) *Attorney, Agent, or Firm* — Young & Thompson

(57) ABSTRACT

A belt body (10) of a friction transmission belt (B) includes a pulley contacting portion (13) made of a rubber composition. The rubber composition forming the pulley contacting portion (13) includes an ethylene-α-olefin elastomer as a rubber component, and in the rubber composition, 10-50 parts by mass of calcium carbonate relative to 100 parts by mass of the rubber component, and carbon black whose DBP oil absorption amount measured according to the method A specified in Japanese Industrial Standards (JIS) K 6217-4 is 300 $cm^3$/100 g or more are mixed.

8 Claims, 6 Drawing Sheets

(56) References Cited

FOREIGN PATENT DOCUMENTS

| | | |
|---|---|---|
| JP | 2006-064174 | 3/2006 |
| JP | 2006-266356 | 10/2006 |
| JP | 2007-120526 | 5/2007 |
| JP | 2007-232205 | 9/2007 |
| JP | 2008-291992 | 12/2008 |
| WO | 2007-018148 | 2/2007 |
| WO | 2007/018148 | 2/2007 |
| WO | WO 2007/018148 | 2/2007 |
| WO | WO 2008/078700 | 7/2008 |

\* cited by examiner

FIG.4
(a)
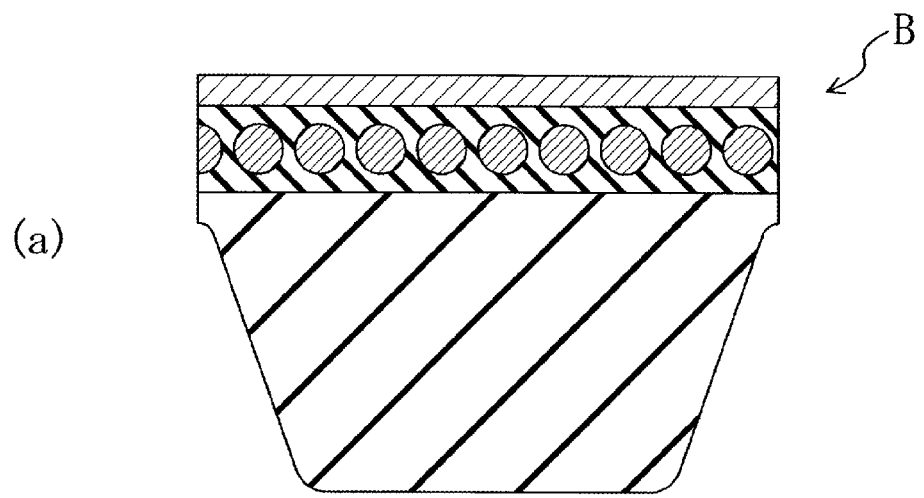
(b)
(c)
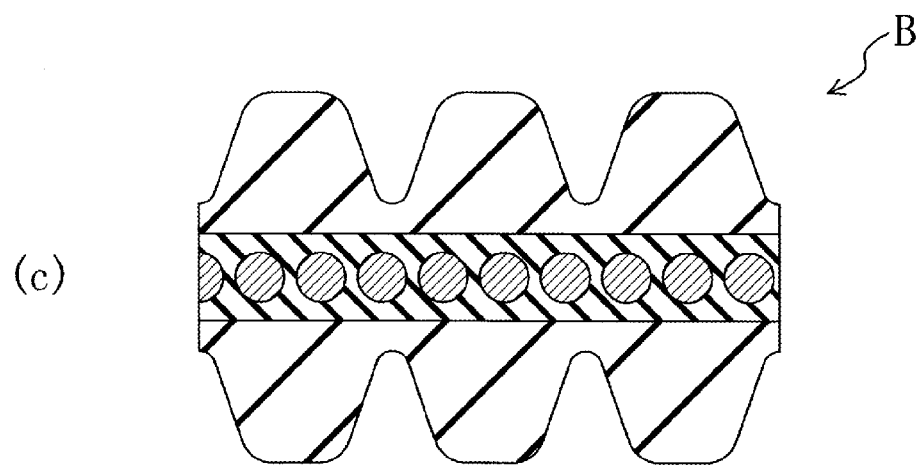

FRICTION TRANSMISSION BELT

TECHNICAL FIELD

The present invention relates to friction transmission belts whose belt body includes a pulley contacting portion made of a rubber composition.

BACKGROUND ART

Friction drive belts, such as V-belts and V-ribbed belts whose belt body includes a pulley contacting portion made of a rubber composition, are widely used for driving vehicle accessories, etc. Mixing carbon black in the rubber composition which forms the pulley contacting portion is a well-known technique.

Patent Document 1 discloses a transmission belt whose transmission face is made of a rubber composition in which 50 to 100 parts by mass of carbon black relative to 100 parts by mass of a rubber component is mixed. Ethylene-α-olefin copolymer rubber is used as the rubber component, and the carbon black contains high structure carbon whose nitrogen absorption specific surface area is 45 to 80 m$^2$/g and DBP oil absorption specific area is 120 cm$^3$/100 g or more, in an amount of 20 parts by mass or more relative to 100 parts by mass of the rubber component.

Here, it is known that in a belt transmission system for driving vehicle accessories, a phenomenon called "stick-slip" occurs when the belt is wet, and slip sound is generated by the slip between the belt and pulley. This slip sound may become a source of noise. Thus, various measures are taken.

For example, Patent Document 2 discloses a transmission belt whose transmission surface is made of a rubber composition containing an inorganic filler. The inorganic filler is a hydrophilic inorganic filler of a hydrophilic inorganic substance which has hydroxyl groups or water molecules, or a hydrophilic inorganic substance precursor which reacts with water to form a hydrophilic inorganic substance. The rubber composition contains 5 parts by mass or more of the hydrophilic inorganic filler relative to 100 parts may mass of rubber.

Patent Document 3 discloses a transmission belt in which at least part of a rubber portion of the belt contains short fibers. Ethylene-propylene-diene rubber whose iodine number is 3 or more and less than 40 is used as a rubber component. Nylon short fibers are singly used as the short fibers, and the mixing amount of the short fibers is 20 to 50 parts by mass relative to 100 parts by mass of the rubber.

Patent Document 4 discloses a V-ribbed belt of which a compression rubber layer as a pulley contact portion is made of a rubber composition in which 3 to 25 parts by mass of nylon resin powders relative to 100 parts by mass of a rubber component are mixed.

Patent Document 5 discloses a V-ribbed belt of which a compression rubber layer as a pulley contact portion is made of a rubber composition in which 1 to 15 parts by mass of porous acrylic short fibers relative to 100 parts by mass of a rubber component are mixed.

Patent Document 6 discloses a V-ribbed belt whose compression rubber layer is made of a rubber composition in which ethylene-α-olefin elastomer is used as a rubber component; short fibers are added to the rubber component in a total amount of 10 to 40 parts by mass relative to 100 parts by mass of the rubber component; the short fibers include aramid fibers in 35-100 mass percent of the total amount of the short fibers added; and 25-55 parts by mass of carbon black is added.

Patent Document 7 discloses a V-ribbed belt whose compression rubber layer as a pulley contact portion is made of a rubber composition in which 1 to 15 parts by mass of very short fibers which have a fiber length of 0.1 to 1.0 mm and water content of 6 to 20%, relative to 100 parts by mass of a rubber component, are mixed.

Patent Document 8 discloses that at least ribs of a V-ribbed belt includes cotton short fibers, nylon short fibers having intermediate elasticity between elasticity of main rubber which forms the ribs and elasticity of the cotton short fibers, and zinc powders.

Patent Document 9 discloses a V-ribbed belt in which a compression rubber layer includes para-aramid short fibers; the para-aramid short fibers protrude from side surfaces of ribs; and the protruded para-aramid short fibers are fibrillated.

Patent Document 10 discloses a V-ribbed belt in which a compression rubber layer includes cotton short fibers and para-aramid short fibers which protrude from side surfaces of ribs; the protruded para-aramid short fibers are fibrillated; and the cotton short fibers and the para-aramid short fibers are mixed in a rubber composition of the compression rubber layer in an amount of 10 to 40 parts by weight, and 5 to 10 parts by weight, respectively, relative to 100 parts by weight of the rubber component in the compression rubber layer.

Patent Document 11 discloses a V-ribbed belt in which at least part of short fibers buried in V-shaped ribs which form a compression rubber layer is para-aramid fibers mixed in a rubber component in amount of 5 to 20 parts by weight relative to 100 parts by weight of the rubber component, and the para-aramid short fibers protruding from side surfaces of the V-shaped ribs are fibrillated.

Patent Document 1: Japanese Patent Publication No. 2006-266356
Patent Document 2: Japanese Patent Publication No. 2007-120526
Patent Document 3: Japanese Patent Publication No. 2004-257459
Patent Document 4: Japanese Patent Publication No. 2004-232743
Patent Document 5: Japanese Patent Publication No. 2004-176904
Patent Document 6: Japanese Patent Publication No. 2004-150524
Patent Document 7: Japanese Patent Publication No. 2004-125012
Patent Document 8: Japanese Patent Publication No. 2003-202055
Patent Document 9: Japanese Patent Publication No. 2001-254782
Patent Document 10: Japanese Patent Publication No. 2001-165244
Patent Document 11: Japanese Patent Publication No. H07-151191

SUMMARY OF THE INVENTION

A friction transmission belt of the present invention has a belt body including a pulley contacting portion made of a rubber composition, wherein the rubber composition forming the pulley contacting portion includes an ethylene-α-olefin elastomer as a rubber component, and in the rubber composition, 10-50 parts by mass of calcium carbonate relative to 100 parts by mass of the rubber component, and carbon black whose DBP oil absorption amount measured according to the method A specified in Japanese Industrial Standards (JIS) K 6217-4 is 300 cm³/100 g or more are mixed.

BRIEF DESCRIPTION OF THE DRAWINGS

FIG. 4(a) to FIG. 4(c) are cross-sectional views of belts according to other embodiments.

DESCRIPTION OF EMBODIMENTS

An embodiment will be described below.

In a friction transmission belt according to the present embodiment, a belt body includes a pulley contacting portion made of a rubber composition. The rubber composition forming the pulley contacting portion includes an ethylene-α-olefin elastomer as a rubber component. Calcium carbonate of 10-50 parts by mass relative to 100 parts by mass of the rubber component, and carbon black whose DBP oil absorption amount measured according to the method A specified in Japanese Industrial Standards (JIS) K 6217-4 is 300 cm³/100 g or more are mixed in the rubber composition.

According to this friction transmission belt, the rubber composition forming the pulley contacting portion includes an ethylene-α-olefin elastomer as a rubber component, and 10-50 parts by mass of calcium carbonate relative to 100 parts by mass of the rubber component, and carbon black whose DBP oil absorption amount is 300 cm³/100 g or more are mixed in the rubber composition. Thus, due to an interaction between these materials, the generation of slip sound during belt running is reduced even when the belt is wet.

Figure 1:
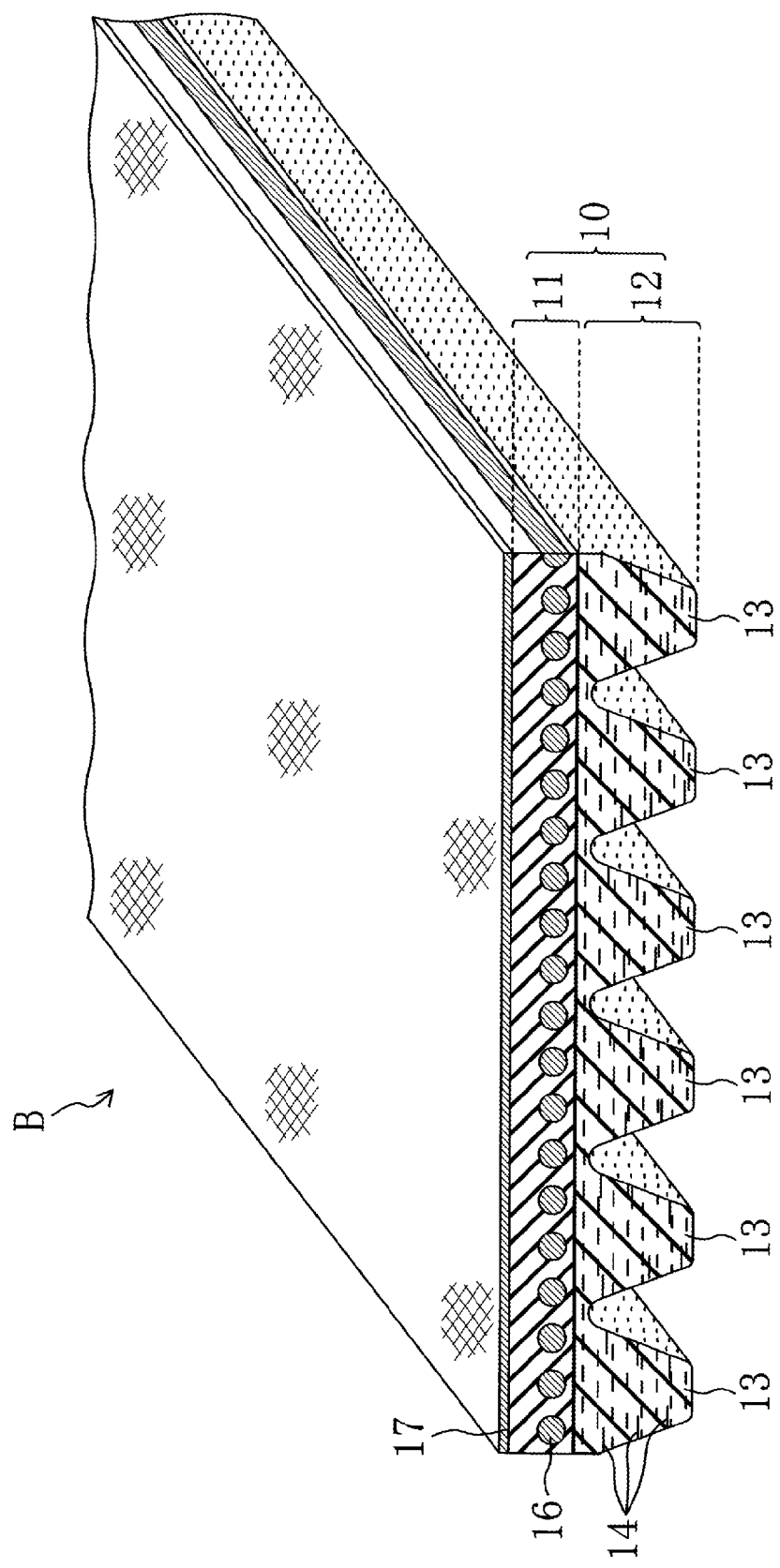
FIG. 1 is an oblique view of a V-ribbed belt.

FIG. 1 is a V-ribbed belt B as an example friction transmission belt according to the present embodiment. The V-ribbed belt B of the present embodiment is preferably used, for example, for driving vehicle accessories, and is formed to have a length of 700-3000 mm, a width of 10-36 mm, and a thickness of 4.0-5.0 mm.

The V-ribbed belt B of the present embodiment includes a double-layer V-ribbed belt body 10 including an adhesion rubber layer 11 constituting an outer portion of the belt, and a compression rubber layer 12 constituting an inner portion of the belt. A reinforcement fabric 17 is adhered to the outer surface of the V-ribbed belt body 10. A core wire 16 arranged helically at a certain pitch in a width direction of the belt, is embedded in the adhesion rubber layer 11.

The adhesion rubber layer 11 is in the shape of a strip having an oblong cross section, and has a thickness of 1.0-2.5 mm, for example. The adhesion rubber layer 11 is made of a rubber composition containing a rubber component, and various compounding ingredients mixed in the rubber component. Examples of the rubber component of the rubber composition forming the adhesion rubber layer 11 include, for example, an ethylene-α-olefin elastomer such as ethylene-propylene rubber (EPR) and ethylene propylene diene monomer rubber (EPDM), chloroprene rubber (CR), chlorosulfonated polyethylene rubber (CSM), and hydrogenated acrylonitrile-butadiene rubber (H-NBR). Among them, the ethylene-α-olefin elastomer is preferable in terms of environmental friendliness, resistance to wear, resistance to cracking, etc. Examples of the compounding ingredients include, for example, crosslinkers (e.g., sulfur and organic peroxide), antioxidants, processing aids, plasticizers, reinforcing agents such as carbon black, and fillers. The rubber composition forming the adhesion rubber layer 11 is produced by heating and pressing an uncrosslinked rubber composition prepared by kneading the rubber component mixed with a compounding ingredient, and crosslinking the kneaded product by a crosslinker.

The compression rubber layer 12 includes a plurality of V-shaped ribs 13 which constitute a pulley contacting portion, and which protrude from the inner side of the belt. Each of the plurality of V-shaped ribs 13 is in the shape of a protrusion extending in the longitudinal direction of the belt, and having a substantially inverted triangular cross section. The V-shaped ribs 13 are arranged next to each other in the width direction of the belt. Each of the V-shaped ribs 13 has, for example, a height of 2.0-3.0 mm, and a proximal end width of 1.0-3.6 mm. The belt includes 3-6 ribs, for example (6 ribs in FIG. 1).

The compression rubber layer 12 is made of a rubber composition in which various compounding ingredients are mixed in the ethylene-α-olefin elastomer as a rubber component. Examples of the ethylene-α-olefin elastomer as the rubber component which forms the compression rubber layer 12 include, for example, ethylene-propylene rubber (EPR) and ethylene propylene diene monomer rubber (EPDM). Examples of the compounding ingredients include, for example, crosslinkers (e.g., sulfur and organic peroxide), antioxidants, processing aids, plasticizers, calcium carbonates, reinforcing agents such as carbon black, fillers, ultrahigh molecular weight polyethylene particles (weight average molecular weight of one million or more), and short fibers 14. The rubber composition forming the compression rubber layer 12 is produced by heating and pressing an uncrosslinked rubber composition prepared by kneading the rubber component mixed with a compounding ingredient, and crosslinking the kneaded product by a crosslinker.

The rubber composition forming the compression rubber layer 12 is mixed with carbon black, and the carbon black includes carbon black whose DBP oil absorption amount measured according to the method A specified in JIS K 6217-4 is 300 cm³/100 g or more. The carbon black preferably includes FEF carbon black.

A total mixing amount of the carbon black is preferably 1-120 parts by mass, more preferably 20-90 parts by mass, relative to 100 parts by mass of the rubber component.

Further, the carbon black whose DBP oil absorption amount is 300 cm³/100 g or more has a primary particle diameter of preferably 15-80 nm, more preferably 20-50 nm, and has a BET specific surface area of preferably 400 m²/g or more, more preferably 600 m²/g or more. The carbon black whose DBP oil absorption amount is 300 cm³/100 g or more is preferably a conductive carbon black to prevent the belt from being charged. A total mixing amount of the carbon black whose DBP oil absorption amount is 300 cm³/100 g or more is preferably 1-50 parts by mass, more preferably 1-30 parts by mass, relative to 100 parts by mass of the rubber component.

A total mixing amount of the FEF carbon black is preferably 1-120 parts by mass, more preferably 20-90 parts by mass, relative to 100 parts by mass of the rubber component.

Other examples of the carbon black may include channel black, furnace black such as SAF, ISAF, N-339, HAF, N-351, MAF, SRF, GPF, ECF, and N-234, thermal black such as FT and MT, and acetylene black.

The rubber composition forming the compression rubber layer 12 is mixed with calcium carbonate. A particle diameter of the calcium carbonate is preferably 0.001-20 µm, more preferably 0.001-10 µm. A specific surface area of the calcium carbonate is preferably 0.1-30 m$^2$/g, more preferably 1-30 m$^2$/g. A DOP absorption amount of the calcium carbonate is preferably 10-100 ml/100 g, more preferably 10-80 ml/100 g. A pH of the calcium carbonate is preferably 7.5-9.8, more preferably 8.0-9.5. A mixing amount of the calcium carbonate is 10-50 parts by mass, more preferably 10-30 parts by mass, relative to 100 parts by mass of the rubber component.

As described, according to the V-ribbed belt B of the present embodiment, the rubber composition which forms the compression rubber layer 12 including the V-shaped ribs 13 as a pulley contacting portion, includes an ethylene-α-olefin elastomer as a rubber component, and in the rubber composition, 10-50 parts by mass of calcium carbonate relative to 100 parts by mass of the rubber component, and carbon black whose DBP oil absorption amount is 300 cm$^3$/100 g or more are mixed. Thus, due to an interaction between these materials, the generation of slip sound during belt running is reduced even when the belt is wet.

The short fibers 14 mixed in the rubber composition forming the compression rubber layer 12 are oriented in the width direction of the belt. Some of the short fibers 14 are exposed at a pulley contacting surface, that is, surfaces of the V-shaped ribs 13. The short fibers 14 exposed at the surfaces of the V-shaped ribs 13 may protrude from the surfaces of the V-shaped ribs 13.

Examples of the short fibers 14 include, for example, nylon short fibers, vinylon short fibers, cotton short fibers, polyester short fibers, and aramid short fibers. The short fibers 14 may be made of a single material, or two or more materials.

The mixing amount of the short fibers 14 is preferably 1-30 parts by mass relative to 100 parts by mass of the rubber component. The short fibers 14 have a length of 0.2-5.0 mm, for example. The length of the short fibers 14 is preferably 3.0 mm or less, more preferably 1.0 mm or less. The short fibers 14 have, for example, a diameter of 10-50 µm. The short fibers 14 are manufactured by, for example, cutting long fiber which is immersed in an aqueous solution of resorcin/formalin/latex (hereinafter referred to as an RFL aqueous solution) and heated for adhesion treatment, into a predetermined length in the longitudinal direction of the long fiber.

The compression rubber layer 12 may not include the short fibers 14, or may have short fibers which adhere to the surfaces of the V-shaped ribs 13 by, for example, being flocked in the surfaces of the V-shaped ribs 13.

The adhesion rubber layer 11 and the compression rubber layer 12 may be made of different rubber compositions, or may be made of the same rubber composition.

The reinforcement fabric 17 may be, for example, woven fabric 17' which is plain-, twill-, or satin-woven fabric of cotton, polyamide fiber, polyester fiber, aramid fiber, etc. To provide the reinforcement fabric 17 with an adhesion property to the V-ribbed belt body 10, adhesion treatment has been performed on the reinforcement fabric 17 before forming the belt, by immersing the fabric into the RFL aqueous solution, and heating the immersed fabric, and/or coating a surface of the fabric facing the V-ribbed belt body 10 with rubber cement, and drying the rubber cement. Instead of providing the reinforcement fabric 17, the outer surface of the belt may be made of a rubber composition. The reinforcement fabric 17 may be knit fabric. In stead of providing the reinforcement fabric 17, the back surface of the belt may be made of an exposed rubber composition.

The core wire 16 is made of twisted yarn 16' of polyester fiber (PET), polyethylene naphthalate fiber (PEN), aramid fiber, vinylon fiber, etc. To provide the core wire 16 with an adhesion property to the V-ribbed belt body 10, adhesion treatment has been performed on the core wire material before forming the belt, by immersing the core wire material in the RFL aqueous solution, and heating the immersed core wire material, and/or immersing the core wire material in rubber cement, and drying the immersed core wire material.

Figure 2:
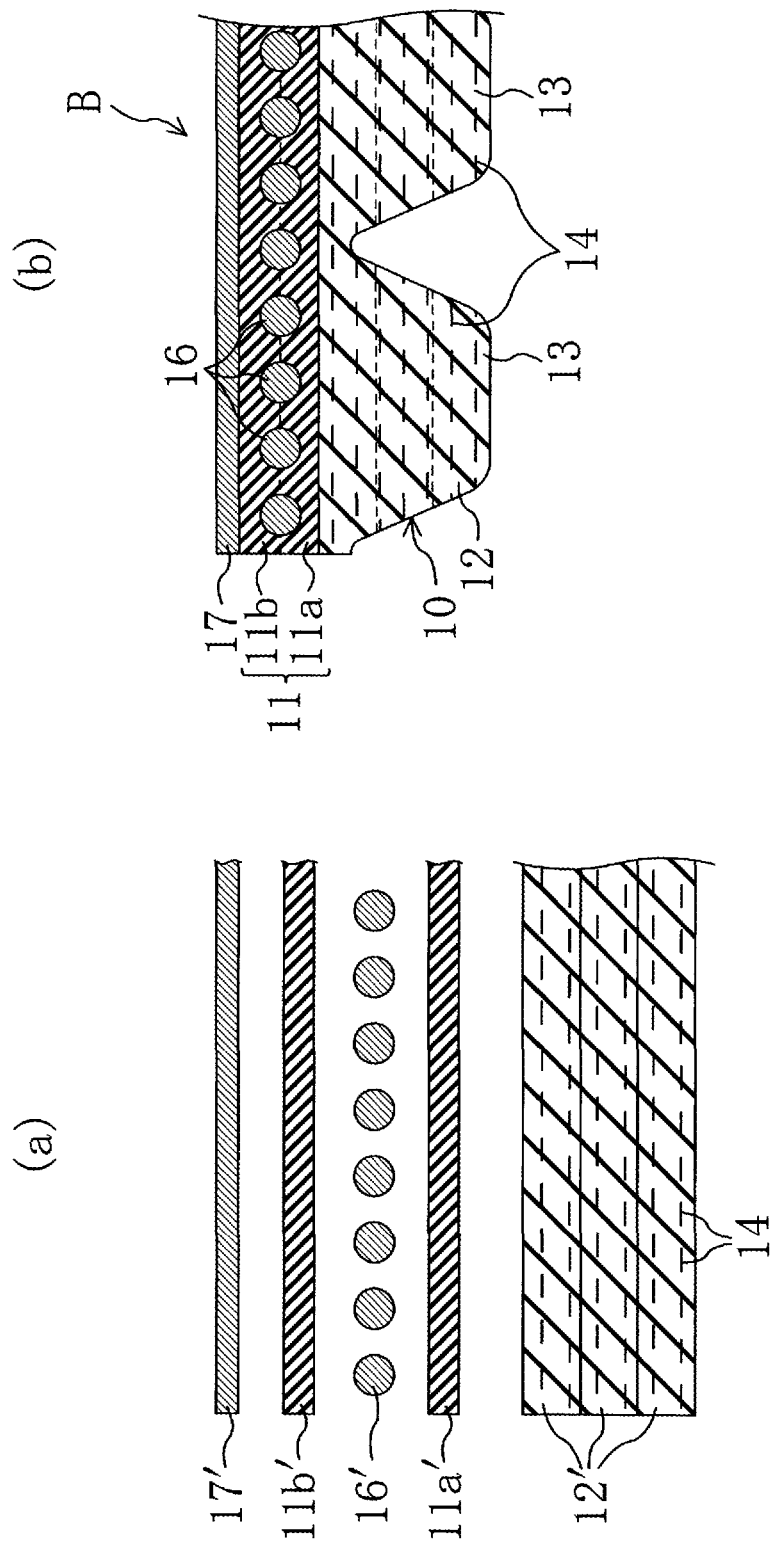
FIG. 2 is an illustrative drawing for showing a method for fabricating a V-ribbed belt.

Next, a method for fabricating the V-ribbed belt B will be described with reference to FIG. 2.

In the fabrication of the V-ribbed belt B, an inner mold having a molding surface on an outer circumference thereof for forming a predetermined shape of the back surface of the belt, and a rubber sleeve having a molding surface on an inner circumference thereof for forming a predetermined shape of the inner surface of the belt are used.

First, the outer circumference of the inner mold is covered with the woven fabric 17' which is to be the reinforcement fabric 17, and an uncrosslinked rubber sheet 11b' for forming an outer portion 11b of the adhesion rubber layer 11 is wrapped around the woven fabric 17'.

Then, the twisted yarn 16' which is to be the core wire 16 is helically coiled around the uncrosslinked rubber sheet 11b', and an uncrosslinked rubber sheet 11a' for forming an inner portion 11a of the adhesion rubber layer 11 is wrapped around. Then, an uncrosslinked rubber sheet 12' for forming the compression rubber layer 12 is wrapped around the uncrosslinked rubber sheet 11a'. Here, the uncrosslinked rubber sheet 12' for forming the compression rubber layer 12 is mixed with the short fibers 14 oriented in a direction orthogonal to the wrapping direction. The uncrosslinked rubber sheet 12' is mixed with 30 parts by mass or less of the short fibers 14 relative to 100 parts by mass of the rubber component, and the short fibers 14 include 1 part by mass or more of vinylon short fibers relative to 100 parts by mass of the rubber component.

Then, the rubber sleeve is put on the obtained product provided on the inner mold, and the rubber sleeve and the inner mold are placed in a molding furnace to heat the inner mold with high temperature water vapor, etc., and to press the rubber sleeve radially inward with high pressure. At this time, the rubber component flows, and a crosslinking reaction proceeds. Simultaneously, the twisted yarn 16' and the woven fabric 17' are reacted to adhere to the rubber. Thus, a tubular belt slab (a base of the belt body) is obtained.

The belt slab is removed from the inner mold, and is divided into several pieces in a longitudinal direction. Then, an outer circumference of each piece is cut and polished to form the V-shaped ribs 13, i.e., the pulley contacting portion. The short fibers 14 exposed on the pulley contacting surface may protrude from the pulley contacting surface, i.e., the surfaces of the V-shaped ribs 13.

Lastly, each of the divided belt slab pieces having the V-shaped ribs 13 on the outer circumference is cut to have a predetermined width. Each of the pieces is turned inside out, thereby obtaining the V-ribbed belt B.

An accessory drive belt transmission system 30 using the V-ribbed belt B and provided in an engine compartment of an automobile will be described below.

Figure 3:
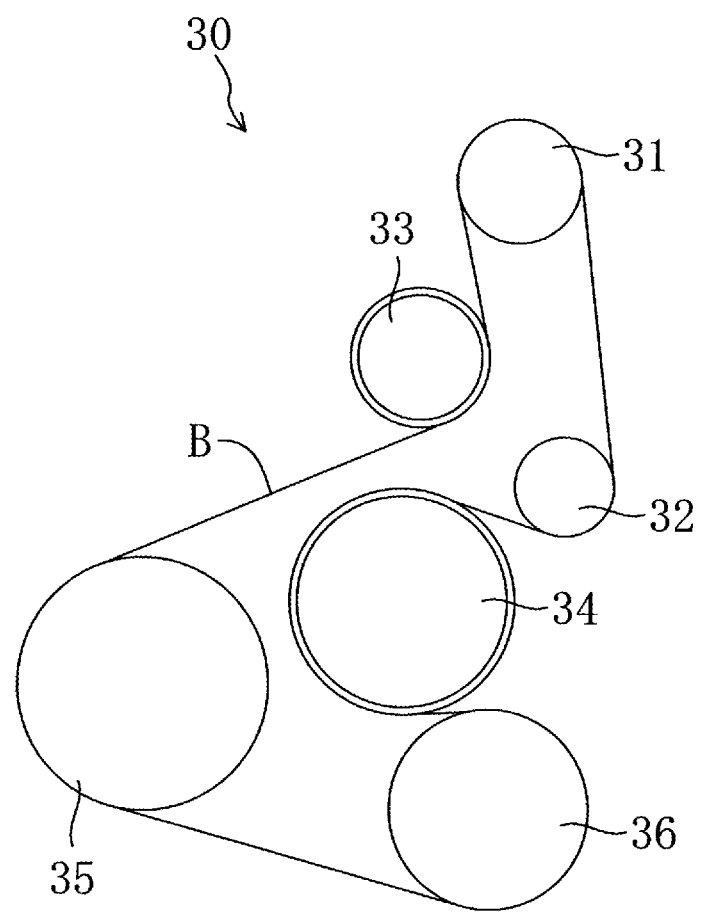
FIG. 3 is a layout of pulleys of an accessory drive belt transmission system.

FIG. 3 shows a layout of pulleys of the accessory drive belt transmission system 30. The accessory drive belt transmission system 30 is a serpentine drive system in which the V-ribbed belt B is wound around 6 pulleys including 4 ribbed pulleys and 2 flat pulleys.

The layout of the accessory drive belt transmission system 30 includes a power steering pulley 31 provided a the topmost position, an AC generator pulley 32 provided below the power steering pulley 31, a flat tensioner pulley 33 provided at a lower left position relative to the power steering pulley 31, a flat water pump pulley 34 provided below the tensioner pulley 33, a crankshaft pulley 35 provided at a lower left position relative to the tensioner pulley 33, and an air conditioner pulley 36 provided at a lower right position relative to the crankshaft pulley 35. The pulleys except for the flat tensioner pulley 33 and the flat water pump pulley 34 are all ribbed pulleys. The V-ribbed belt B is sequentially wound around the power steering pulley 31 with the V-shaped ribs 13 in contact with the power steering pulley 31, the tensioner pulley 33 with the back surface of the belt in contact with the tensioner pulley 33, and the crankshaft pulley 35 and the air conditioner pulley 36 with the V-shaped ribs 13 in contact with the crankshaft pulley 35 and the air conditioner pulley 36. The V-ribbed belt B is further wound around the water pump pulley 34 with the back surface of the belt in contact with the water pump pulley 34, is wound around the AC generator pulley 32 with the V-shaped ribs 13 in contact with the AC generator pulley 32, and is returned to the power steering pulley 31.

In the accessory drive belt transmission system 30 having the above structure, since the V-ribbed belt B of the present embodiment described above is used, the generation of slip sound during belt running is reduced even when the belt is wet. The same effect can be obtained even if the pulley material is aluminum, or if the pulley material is a zinc-plated iron.

In the present embodiment, the V-ribbed belt B has been described, but any friction transmission belts whose pulley contacting portion of the belt body is made of a rubber composition, such as the V-belt B shown in FIG. 4(*a*), the flat belt B shown in FIG. 4(*b*), or the double V-ribbed belt B which has ribs on the back surface, too, as shown in FIG. 4(*c*), may also be used.

In the present embodiment, the entire compression rubber layer 12 is made of a single rubber composition, but at least the pulley contacting portion of the surfaces of the V-shaped ribs 13 may be formed of the rubber composition.

In the present embodiment, the accessory drive belt transmission system 30 having 4 ribbed pulleys has been described, but any accessory drive belt transmission systems which has 5 or more ribbed pulleys may be used as long as the system has three or more pulleys including a pair of ribbed pulleys.

EXAMPLES (Test Evaluation Belt)

V-ribbed belts for Examples 1-5 and Comparative Examples 1-4 described below were fabricated. The structures of the respective V-ribbed belts are also shown in Table 1 and Table 2.

Example 1

Ethylene propylene diene monomer rubber (EPDM) (produced by JSR Corporation, trade name: EP24) was used as a rubber component. 0.25 parts by mass of stearic acid (produced by New Japan Chemical Co., Ltd., trade name: stearic acid 50S), 5 parts by mass of zinc oxide (produced by Sakai Chemical Industry Co., Ltd., trade name: zinc oxide type III), 2.5 parts by mass of antioxidant (produced by Ouchi Shinko Chemical Industrial Co., Ltd., trade name: NOCRAC 224), 50 parts by mass of FEF carbon black (produced by Tokai Carbon Co., Ltd., trade name: SEAST SO, DBP oil absorption amount: 115 $cm^3$/100 g), conductive carbon black (Lion Corporation, trade name: Ketjenblack EC300J, DBP oil absorption amount: 360 $cm^3$/100 g), 10 parts by mass of calcium carbonate (MARUO CALCIUM CO., LTD., trade name: MSK-A), 10 parts by mass of process oil (produced by Japan Sun Oil Company, Ltd., trade name: SUMPAR 2280), 4 parts by mass of crosslinker (produced by NOF CORPORATION, trade name: PERCUMYL D), and 10 parts by mass of nylon short fiber (produced by Asahi Kasei Corporation; trade name: nylon 6,6, type: T-5, fiber length: 1 mm), relative to 100 parts by mass of the rubber component, were mixed. The mixture was kneaded in an internal kneader, and was rolled by open rolls to obtain a sheet-like uncrosslinked rubber composition. A V-ribbed belt whose compression rubber layer was made from the sheet-like uncrosslinked rubber composition was fabricated, and the V-ribbed belt was referred to as Example 1. The DBP oil absorption amounts of FEF carbon black and conductive carbon black are measured according to the method A specified in JIS K 6217-4.

An adhesion rubber layer was made of a rubber composition of EPDM, and a core wire was made of RFL-treated twisted yarn of polyester fiber (PET). No reinforcement fabric was used. The belt had a length of 1210 mm, a width of 21.4 mm, and a thickness of 4.3 mm, and included 6 ribs.

Example 2

A V-ribbed belt was formed which has the same structure as Example 1 except that 20 parts by mass of calcium carbonate relative to 100 parts by mass of the rubber component were mixed in the uncrosslinked rubber composition which forms the compression rubber layer. This V-ribbed belt was referred to as Example 2.

Example 3

A V-ribbed belt was formed which has the same structure as Example 1 except that 30 parts by mass of calcium carbonate relative to 100 parts by mass of the rubber component were mixed in the uncrosslinked rubber composition which forms the compression rubber layer. This V-ribbed belt was referred to as Example 3.

Example 4

A V-ribbed belt was formed which has the same structure as Example 1 except that 40 parts by mass of calcium carbonate relative to 100 parts by mass of the rubber component were mixed in the uncrosslinked rubber composition which forms the compression rubber layer. This V-ribbed belt was referred to as Example 4.

Example 5

A V-ribbed belt was formed which has the same structure as Example 1 except that 50 parts by mass of calcium carbonate relative to 100 parts by mass of the rubber component were mixed in the uncrosslinked rubber composition which forms the compression rubber layer. This V-ribbed belt was referred to as Example 5.

Comparative Example 1

A V-ribbed belt was formed which has the same structure as Example 1 except that 60 parts by mass of FEF carbon black relative to 100 parts by mass of the rubber component were mixed in the uncrosslinked rubber composition which forms the compression rubber layer, and that conductive carbon black and calcium carbonate were not mixed. This V-ribbed belt was referred to as Comparative Example 1.

Comparative Example 2

A V-ribbed belt was formed which has the same structure as Example 1 except that 5 parts by mass of calcium carbonate relative to 100 parts by mass of the rubber component were mixed in the uncrosslinked rubber composition which forms the compression rubber layer. This V-ribbed belt was referred to as Comparative Example 2.

Comparative Example 3

A V-ribbed belt was formed which has the same structure as Example 1 except that 60 parts by mass of calcium carbonate relative to 100 parts by mass of the rubber component were mixed in the uncrosslinked rubber composition which forms the compression rubber layer. This V-ribbed belt was referred to as Comparative Example 3.

Comparative Example 4

A V-ribbed belt was formed which has the same structure as Example 1 except that 60 parts by mass of FEF carbon black relative to 100 parts by mass of the rubber component were mixed in the uncrosslinked rubber composition which forms the compression rubber layer, and that no conductive carbon black was mixed. This V-ribbed belt was referred to as Comparative Example 4.

TABLE 1

| | Example | | | | | Comparative Example | | | |
|---|---|---|---|---|---|---|---|---|---|
| | 1 | 2 | 3 | 4 | 5 | 1 | 2 | 3 | 4 |
| EPDM | 100 | 100 | 100 | 100 | 100 | 100 | 100 | 100 | 100 |
| Stearic Acid | 0.25 | 0.25 | 0.25 | 0.25 | 0.25 | 0.25 | 0.25 | 0.25 | 0.25 |
| Zinc Oxide | 5 | 5 | 5 | 5 | 5 | 5 | 5 | 5 | 5 |
| Antioxidant | 2.5 | 2.5 | 2.5 | 2.5 | 2.5 | 2.5 | 2.5 | 2.5 | 2.5 |
| FEF Carbon Black | 50 | 50 | 50 | 50 | 50 | 60 | 50 | 50 | 60 |
| Conductive Carbon Black | 10 | 10 | 10 | 10 | 10 | 0 | 10 | 10 | 0 |
| Calcium Carbonate | 10 | 20 | 30 | 40 | 50 | 0 | 5 | 60 | 10 |
| Process Oil | 10 | 10 | 10 | 10 | 10 | 10 | 10 | 10 | 10 |
| Crosslinker | 4 | 4 | 4 | 4 | 4 | 4 | 4 | 4 | 4 |
| Short Fiber | 10 | 10 | 10 | 10 | 10 | 10 | 10 | 10 | 10 |

TABLE 2

| | |
|---|---|
| EPDM | JSR Corporation, Trade Name: EP24 |
| Stearic Acid | New Japan Chemical Co., Ltd., Trade Name: stearic acid 50S |
| Zinc Oxide | Sakai Chemical Industry Co., Ltd., Trade Name: zinc oxide type III |
| Antioxidant | Ouchi Shinko Chemical Industrial Co., Ltd., Trade Name: NOCRAC 224 |
| FEF Carbon Black | Tokai Carbon Co., Ltd., Trade Name: SEAST SO |
| Conductive Carbon Black | Lion Corporation, Trade Name: Ketjenblack EC300J |
| Calcium Carbonate | MARUO CALCIUM CO., LTD., Trade Name: MSK-A |
| Process Oil | Japan Sun Oil Company, Ltd., Trade Name: SUMPAR 2280 |
| Crosslinker | NOF CORPORATION, Trade Name: PERCUMYL D |
| Short Fiber | Asahi Kasei Corporation, Trade Name: nylon 6,6, Type: T-5 |

(Method of Test Evaluation)

<Rubber Hardness Test>

For each of Examples 1-5 and Comparative Examples 1-4, the sheet-like uncrosslinked rubber composition which forms the compression rubber layer was formed into a rubber sheet by using an electrothermal pressing machine. The hardness of the rubber was measured using the rubber sheet by a type A durometer according to JIS K 6253.

<Tensile Test>

For each of Examples 1-5 and Comparative Examples 1-4, the sheet-like uncrosslinked rubber composition which forms the compression rubber layer was formed into a rubber sheet by using an electrothermal pressing machine. No. 3 dumbbell-shaped test pieces were punched out from the rubber sheet, and a tension test was performed using the test pieces to measure tensile strength and elongation at breakage, according to JIS K 6253. The No. 3 dumbbell-shaped test pieces were punched out so that the longitudinal direction of the test pieces was perpendicular to the direction along which the short fibers are oriented.

<Heat Bending Resistance Test>

Figure 5:
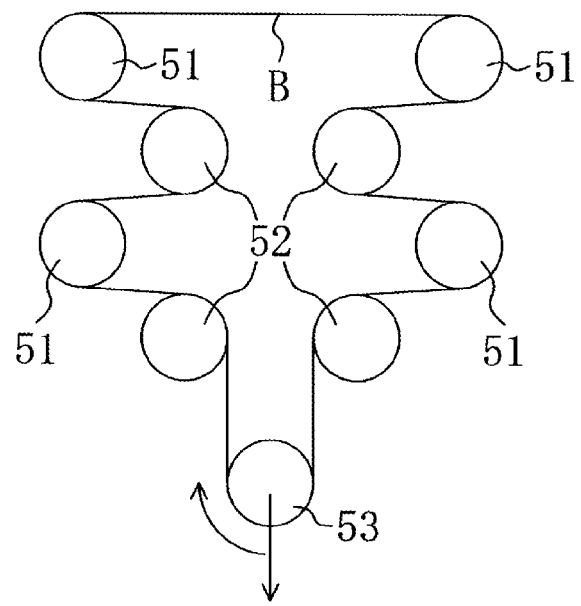
FIG. 5 is a layout of pulleys of a belt running test machine used for a heat bending resistance test.

FIG. 5 is a layout of pulleys of a belt running test machine 50 used for a heat bending resistance test.

The belt running test machine 50 used for a heat bending resistance test includes four ribbed driven pulleys 51 each of which has a diameter of 50 mm and which are positioned at locations corresponding to the four corners of a rectangle, four flat driven pulleys 52 each of which has a diameter of 50 mm and which are positioned at locations corresponding to the four corners of a square, and a ribbed drive pulley 53 having a diameter of 60 mm. The two upper flat driven pulleys 52 are positioned at locations in the middle of the upper and lower ribbed driven pulleys 51 in the vertical direction in the area surrounded by the four ribbed driven pulleys 51 positioned at locations corresponding to the four corners of the rectangle. The two lower flat driven pulleys 52 are provided at lower positions relative to the lower ribbed driven pulleys 51. The ribbed drive pulley 53 is provided at a lower position relative to the lower flat driven pulleys 52, and positioned at a location in the middle of the ribbed driven pulleys 51 and the flat driven pulleys 52 along the horizontal direction. No rotational load is applied to any of the ribbed driven pulleys 51 and the flat driven pulleys 52.

Each of the V-ribbed belts B according to Examples 1-5 and Comparative Examples 1-4 is alternately wound around the ribbed driven pulleys 51 and the flat driven pulleys 52, with the V-shaped ribs of the compression rubber layer in contact with the ribbed driven pulleys 51, and with the reinforcement fabric in contact with the flat driven pulleys 52. Then, the V-ribbed belt B is wound around the ribbed drive pulley 53, with the V-shaped ribs of the compression rubber layer in contact with the ribbed drive pulley 53. Then, a downward load was applied to the ribbed drive pulley 53 so that a tension of 800 N was applied to the belt, and the belt was driven by rotating the ribbed drive pulley 53 at 3300 rpm. At this time, the ambient temperature was increased to 100° C., and was maintained for 50 hours. After that, the ambient temperature was increased to 105° C., and was maintained for 50 hours. This temperature control in which the ambient temperature was increased by 5° C., and was maintained for 50 hours, was repeated until the ambient temperature reached 130° C. After 300 hours at which the ambient temperature reached 130° C., the ambient temperature was maintained at 130° C.

The running of the belt was stopped periodically for a visual check of the V-ribbed belt B. The belt running time until occurrence of a crack was recorded as a belt running lifetime against heat bending. A belt running lifetime against heat bending of Comparative Example 1 was set to 100, and relative values were calculated.

<Electrical Resistance Test>

Figure 6:
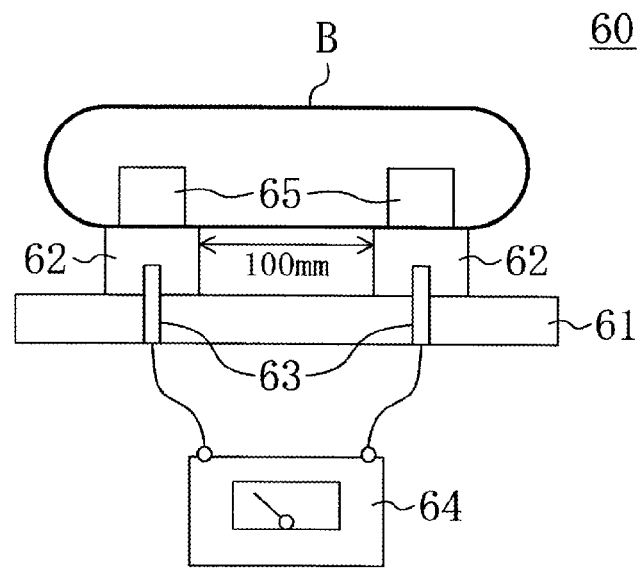
FIG. 6 is a schematic drawing of an electrical resistance measurement device.

FIG. 6 is an electrical resistance measurement device 60.

The electrical resistance measurement device 60 includes a pair of terminals 63 provided on a base 61, to each of which a brass base 62 is attached. Each of the pair of terminals 63 is electrically connected to an electrical resistance meter 64. The space between the brass bases 62 attached to the pair of terminals 63 is 100 mm. A weight 65 of 1 kg is provided for each of the brass bases 62.

Each of the V-ribbed belts B of Examples 1-5 and Comparative Examples 1-4 was bridged between the pair of brass bases 62, and was sandwiched between the weights 65 and the brass bases 62. In this state, a voltage of 500 V was applied between the terminals 63 to measure an electrical resistance. Further, the belt was driven for 120 hours at an ambient temperature of 130° C., using the belt running test machine 50 for a heat bending resistance test shown in FIG. 5, and an electrical resistance was measured thereafter in a similar manner.

<Wear Resistance Test>

Figure 7:
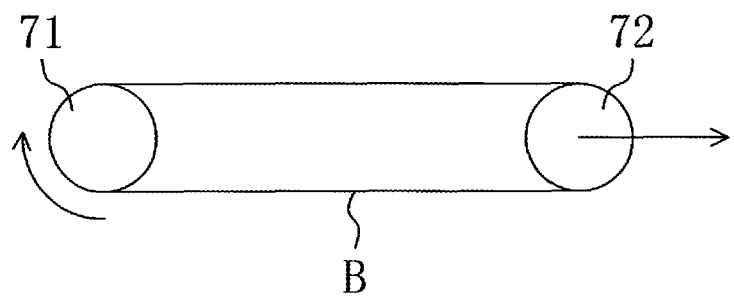
FIG. 7 is a layout of pulleys of a belt running test machine used for a wear resistance test.

FIG. 7 is a layout of pulleys of a belt running test machine 70 used for a wear resistance test.

The belt running test machine 70 used for a wear resistance test includes a ribbed drive pulley 71 and a ribbed driven pulley 72 spaced apart laterally, each of which has a diameter of 60 mm. A rotational load of 3.8 kW is applied to the ribbed driven pulley 72.

The mass of each of the V-ribbed belts B of Examples 1-5 and Comparative Examples 1-4 was measured. After that, the V-ribbed belt B was wound around the ribbed drive pulley 71 and the ribbed driven pulley 72, with the V-shaped ribs of the compression rubber layer in contact with the ribbed drive pulley 71 and the ribbed driven pulley 72. Then, dead weight was laterally applied to the ribbed drive pulley 71 so that a tension of 1177 N was applied to the belt, and the belt was driven by rotating the ribbed drive pulley 71 at 3500 rpm for 24 hours. After that, the mass of the belt was measured again.

A reduction of the mass of the belt before and after the belt running was divided by the mass before the belt running, thereby obtaining a wear rate. A wear rate of Comparative Example 1 was set to 100, and relative values were calculated as wear resistance.

<Noise Test on Wet Belt>

Figure 8:
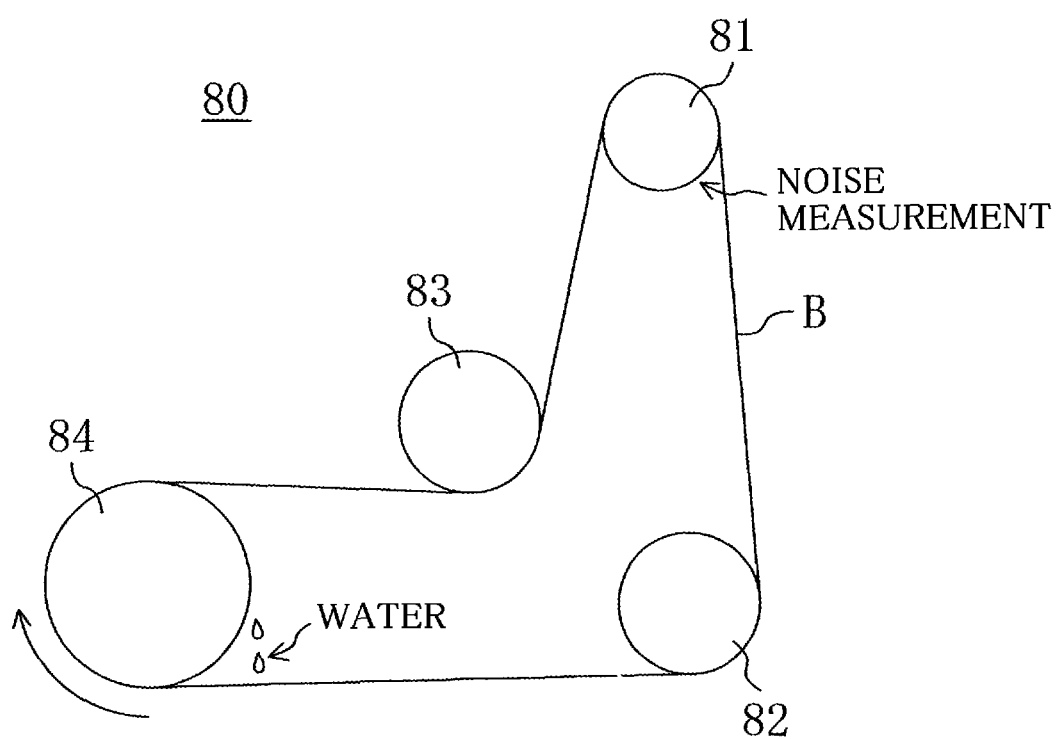
FIG. 8 is a layout of pulleys of a belt running test machine used for a noise test on a wet belt.

FIG. 8 is a layout of a belt running test machine 80 used for a noise test on wet belt.

The belt running test machine 80 used for a noise test on wet belt includes a first ribbed driven pulley 81 attached to a generator and having a diameter of 60 mm, a second ribbed driven pulley 82 provided at a lower right position relative to the first ribbed driven pulley 81 and having a diameter of 75 mm, a flat driven pulley 83 provided at a lower left position relative to the first ribbed driven pulley 81 and upper left position relative to the second ribbed driven pulley 82, and having a diameter of 75 mm, and a ribbed drive pulley 84 provided at a left position relative to the second ribbed driven pulley 82 and lower left position relative to the flat driven pulley 83, and having a diameter of 140 mm. No rotational load is applied to both of the second ribbed driven pulley 82 and the flat driven pulley 83.

Each of the V-ribbed belts B of Examples 1-5 and Comparative Examples 1-4 was wound around the first and second ribbed driven pulleys 81, 82 and the ribbed drive pulley 84, with the V-shaped ribs of the compression rubber layer in contact with the first and second ribbed driven pulleys 81, 82 and the ribbed drive pulley 84, and wound around the flat driven pulley 83, with the reinforcement fabric in contact with the flat driven pulley 83. Then, the test machine 80 was set such that a tension of 49.0 N per rib was applied to the belt. The belt was driven by rotating the ribbed drive pulley 84 at 800 rpm. At this time, a rotational load was applied to the first ribbed driven pulley 81 such that a current of 60 A was generated by the generator.

Noise was measured using a noise meter placed at a lower right position relative to the first ribbed driven pulley 81 immediately after the belt was separated from the first ribbed driven pulley 81. Then, the belt running was once stopped, and the V-ribbed belt B was wetted with 500 ml water at a right position relative to the ribbed drive pulley 84 immediately before the belt was wound around the ribbed drive pulley 84. After that, the belt was driven again to measure noise in a similar manner using a noise meter.

If a difference between loudness of sound before and after the belt was wetted is equal to or less than 1 dB, or even if the difference is over 1 dB but the sound is detected for one second or less, the belt was regarded as generating no noise. If the sound loudness difference is over 1 dB, and the sound continues more than one second, the belt was regarded as generating noise.

(Results of Evaluation Test)

Table 3 and Table 4 show the results of the evaluation test.

TABLE 3

|  | Example | | | | | Comparative Example | | | |
| --- | --- | --- | --- | --- | --- | --- | --- | --- | --- |
|  | 1 | 2 | 3 | 4 | 5 | 1 | 2 | 3 | 4 |
| Rubber Hardness Duro-A | 82 | 83 | 83 | 84 | 85 | 77 | 82 | 86 | 76 |
| Tensile Strength Mpa | 13.2 | 12.8 | 12.7 | 12.0 | 12.4 | 12.5 | 13.4 | 11.9 | 12.1 |
| Elongation at Breakage % | 210 | 220 | 200 | 220 | 210 | 220 | 230 | 180 | 240 |

TABLE 4

|  | Example | | | | | Comparative Example | | | |
| --- | --- | --- | --- | --- | --- | --- | --- | --- | --- |
|  | 1 | 2 | 3 | 4 | 5 | 1 | 2 | 3 | 4 |
| Belt Running Lifetime Against Heat Bending | 100 | 100 | 90 | 80 | 80 | 100 | 100 | 50 | 105 |
| Electrical Resistance Before Belt Running MΩ | 0.70 | 0.78 | 0.98 | 1.00 | 1.17 | 4.56 | 0.70 | 1.23 | 8.97 |
| Electrical Resistance After Belt Running MΩ | 56.0 | 77.0 | 94.0 | 102 | 124 | 4000 | 45.0 | 142 | 4000 |
| Wear Resistance | 100 | 105 | 110 | 110 | 120 | 100 | 100 | 200 | 140 |
| Noise Generation | No | No | No | No | No | Yes | Yes | No | No |

The results show that Examples 1-5 have high resistance to heat bending, low electrical resistance, and high resistance to wear, and generate no slip sound when the belts are wet. On the other hand, Comparative Examples 1 and 2 generate slip sound when the belts are wet. With respect to Comparative Example 3, no slip sound is generated when the belt is wet, but the belt has low resistance to wear. With respect to Comparative Example 4, no slip sound is generated when the belt is wet, but the belt has high electrical resistance.

INDUSTRIAL APPLICABILITY

The present invention is useful as a friction transmission belt whose belt body includes a pulley contacting portion made of a rubber composition.

The invention claimed is:

1. A friction transmission belt, comprising:
a belt body including a pulley contacting portion made of a non-coated rubber composition, wherein
the rubber composition forming the pulley contacting portion includes an ethylene-α-olefin elastomer as a rubber component, and, per 100 parts by mass of the rubber component, 10-30 parts by mass of calcium carbonate whose particle diameter is 0.001-20 μm, 1-30 parts by mass of conductive carbon black whose DBP oil absorption amount measured according to the method A specified in Japanese Industrial Standards (JIS) K 6217-4 is 300 cm$^3$/100 g or more, and 1-120 parts by mass of FEF carbon black.

2. The friction transmission belt of claim 1, wherein the belt body is a V-ribbed belt body.

3. The friction transmission belt of claim 2 used for driving a vehicle accessory.

4. The friction transmission belt of claim 1 used for driving a vehicle accessory.

5. The friction transmission belt according to claim 1, wherein a total mixing amount of the FEF carbon black is 20-90 parts by mass, relative to 100 parts by mass of the rubber component.

6. The friction transmission belt according to claim 1, wherein the particle diameter of the calcium carbonate is 0.001-10 μm.

7. The friction transmission belt according to claim 1, wherein a pH of the calcium carbonate is 7.5-9.8.

8. A friction transmission belt, comprising:
a belt body including a pulley contacting portion made of a rubber composition, wherein
the rubber composition forming the pulley contacting portion includes an ethylene-α-olefin elastomer as a rubber component, and, per 100 parts by mass of the rubber component, 10-30 parts by mass of calcium carbonate whose particle diameter is 0.001-20 μm, 1-30 parts by mass of conductive carbon black whose DBP oil absorption amount measured according to the method A specified in Japanese Industrial Standards (JIS) K 6217-4 is 300 cm$^3$/100 g or more, and 1-120 parts by mass of FEF carbon black.

* * * * *